UNITED STATES PATENT OFFICE.

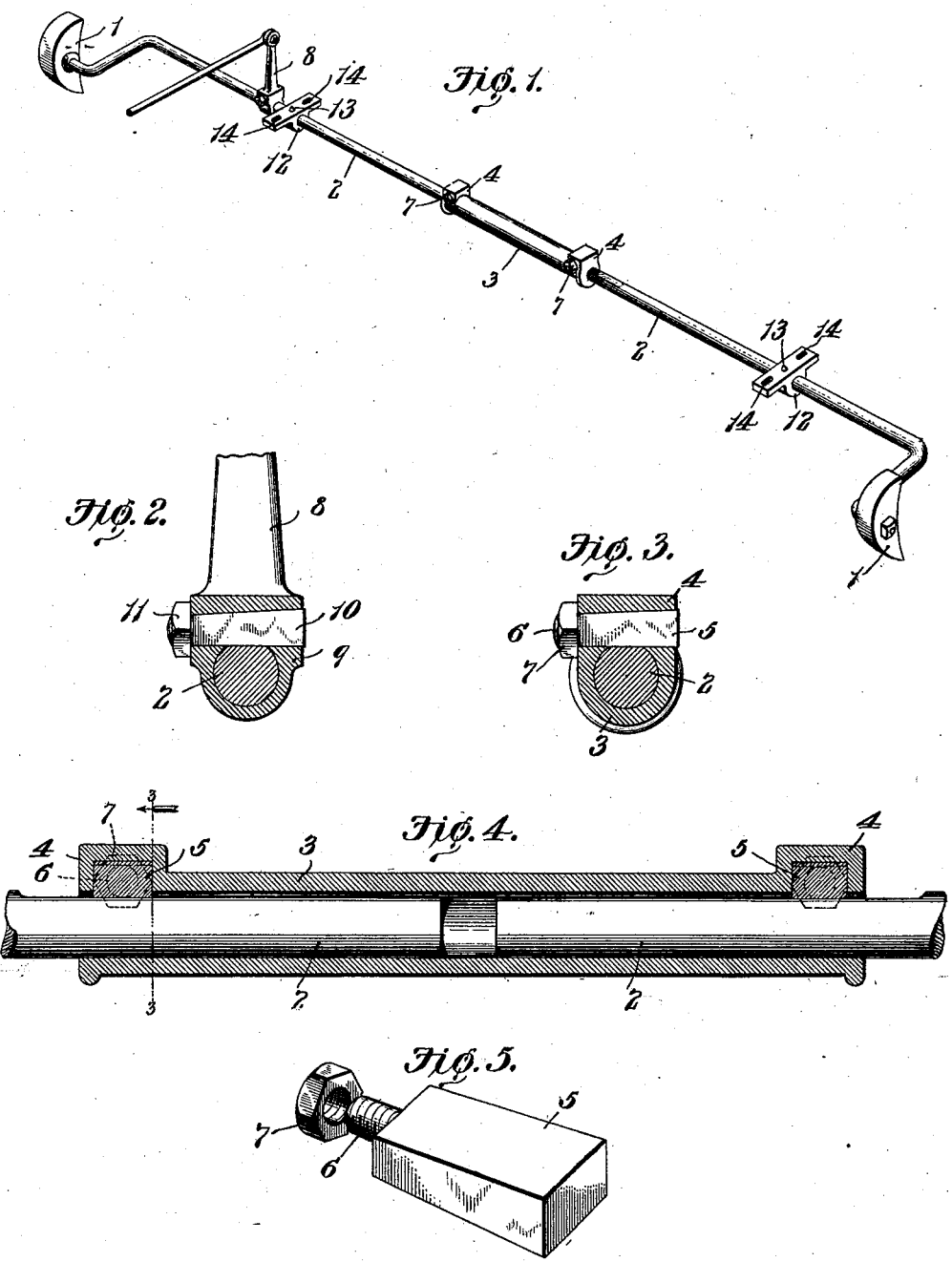

GEORGE S. TEBBETTS, OF ST. LOUIS, MISSOURI, ASSIGNOR TO L. B. TEBBETTS & SONS CARRIAGE COMPANY, OF ST. LOUIS, MISSOURI, A CORPORATION OF MISSOURI.

VEHICLE-BRAKE.

No. 842,271.  Specification of Letters Patent.  Patented Jan. 29, 1907.

Application filed June 30, 1906. Serial No. 324,198.

*To all whom it may concern:*

Be it known that I, GEORGE S. TEBBETTS, a citizen of the United States, residing at St. Louis, Missouri, have invented a certain new and useful Improvement in Adjustable Vehicle-Brakes, of which the following is a full, clear, and exact description, such as will enable others skilled in the art to which it appertains to make and use the same, reference being had to the accompanying drawings, forming part of this specification, in which—

Figure 1 is a perspective view showing a vehicle-brake constructed in accordance with my invention. Fig. 2 is a detail view, partly in section, of the crank-arm. Fig. 3 is a cross-sectional view taken on the line 3 3 of Fig. 4. Fig. 4 is an enlarged detail view, partly in section, of the sleeve which connects the two brake-shoe shafts together, and Fig. 5 is an enlarged perspective view of one of the keys for fastening the brake-shoe shafts to the sleeve.

This invention relates to vehicle-brakes; and the object of my invention is to provide a brake of improved construction which can be adjusted to fit a vehicle of any gage and which will be much stronger than the adjustable brakes heretofore in use.

Referring to the drawings, which represent the preferred form of my invention, 1 designates the brake-shoes, which are carried by shafts 2, having their ends projecting into a sleeve 3 and being adjustably connected thereto, thereby enabling the positions of the shoes relatively to each other to be changed to correspond to the gage of the vehicle on which the brake is used.

One of the novel features of my invention consists in the construction of the sleeve 3 and the means for connecting the shafts 2 to the sleeve.

Referring to Fig. 4, it will be seen that the sleeve is provided at its opposite ends with enlarged portions 4, in which keyways are formed to receive wedge-shaped keys 5, that coöperate with flattened portions on the shafts 2, and thus securely fasten said shafts to the sleeve. Preferably the keys 5 are provided with threaded extensions 6, which receive lock-nuts 7, that bear against straight faces on the enlarged portions of the sleeve, as shown in Fig. 3, and thus prevent said keys from being accidentally displaced. A construction of this character is not only very strong and rigid but eliminates all possibility of the shafts becoming disconnected from the sleeve or turning relatively thereto, as the keys have an extended bearing-surface on the shafts and are so arranged that they would not be apt to drop out of the enlarged portions of the sleeve, even though the nuts 7 should become loosened by the vibration of the vehicle on which the brake is mounted. The crank-arm 8, to which the brake-lever is connected, is also provided with an enlarged portion 9, that receives a wedge-shaped key 10 for connecting said arm to one of the shafts 2, and said key is preferably provided with a lock-nut 11. The brackets 12, in which the shafts 2 are mounted for connecting the brake to the vehicle, are provided with pointed projections 13, adapted to sink into the wooden member on which they are mounted, and said brackets are provided with elongated slots 14, through which fastening devices extend for securing said brackets in place. By providing the brackets with elongated slots, as herein shown, a wide range of adjustment is permitted, which is another very desirable feature of my invention, as it enables the brake to be applied to a great many vehicles of different size and construction.

Having thus described the invention, what is claimed as new, and desired to be secured by Letters Patent, is—

A vehicle-brake comprising a sleeve provided at its opposite ends with enlarged portions which project above the upper surface of the sleeve, brake-shoe shafts projecting into said sleeve and provided at their inner ends with flat faces, wedge-shaped keys arranged in horizontally-disposed keyways in the enlarged portions of said sleeve and engaging the flat faces of said shafts, said keys being rectangular in cross-section, threaded projections on the ends of said keys and of less diameter than the body portion of the keys, nuts mounted on said projections and bearing against flat faces on the enlarged portions of the sleeve, a crank-arm mounted on one of said shafts and provided with an enlarged portion which receives a horizontally-disposed wedge-shaped key that engages a flat face on the upper side of the shaft, a lock-nut on a threaded projection on said key, brackets for supporting said shafts and being provided with elongated slots through which fastening devices extend, and pointed projections on said brackets adapted to sink into the members to which the brackets are connected; substantially as described.

In testimony whereof I hereunto affix my signature, in the presence of two witnesses, this 28th day of June, 1906.

GEORGE S. TEBBETTS.

Witnesses:
WELLS L. CHURCH,
GEORGE BAKEWELL.